June 23, 1942.  J. L. GARY  2,287,764
MICROSCOPE AND ILLUMINATED STAND THEREFOR
Filed March 13, 1940
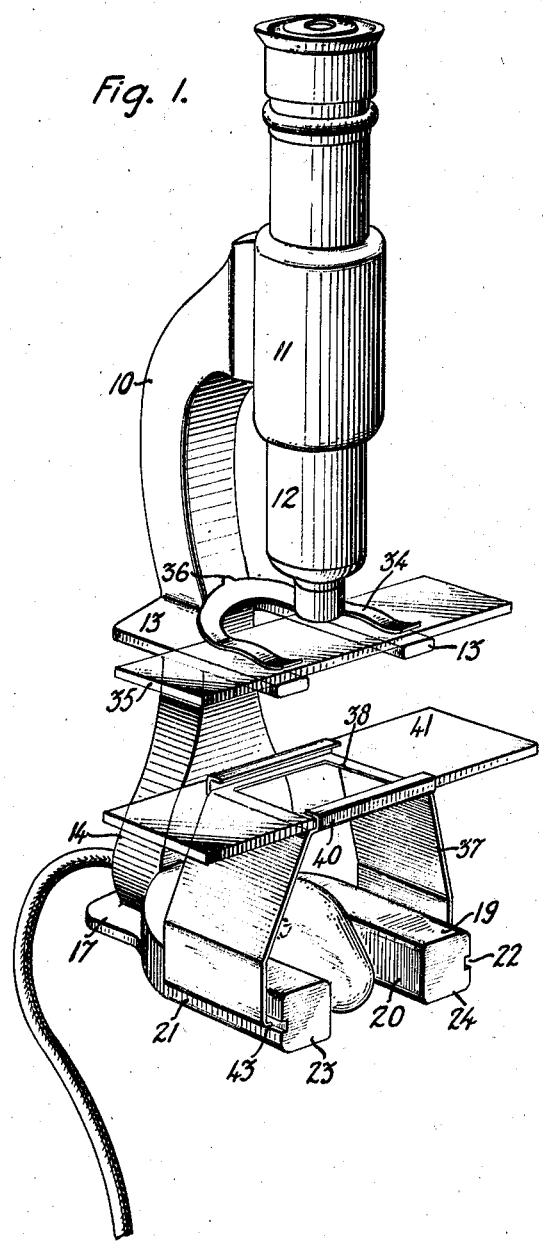
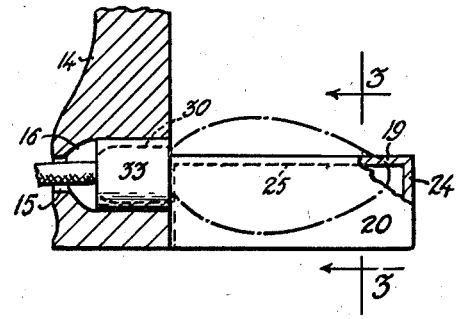
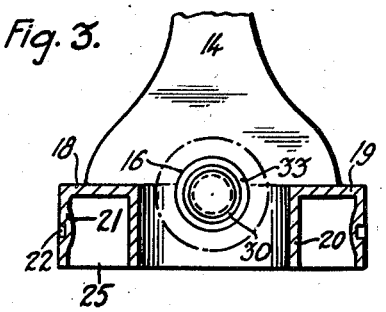
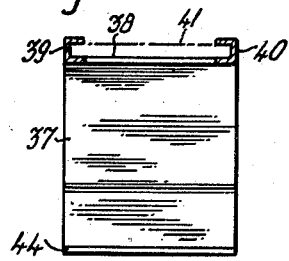
INVENTOR,
JACQUES L. GARY:
BY
ATTORNEY Patented June 23, 1942

2,287,764

UNITED STATES PATENT OFFICE 2,287,764

MICROSCOPE AND ILLUMINATED STAND THEREFOR

Jacques L. Gary, Bronx, N. Y., assignor to Robert Gary, Bronx, N. Y.

Application March 13, 1940, Serial No. 323,691

4 Claims. (Cl. 88—39)

This invention relates to microscopes and has particular reference to illuminated stands therefor.

One of the objects of the invention is the provision of an organization in which the constituent elements are so arranged structurally and functionally as to assure improved results with simplified structures which may be manufactured at reasonable cost, and which may retain its efficient working qualities for a relatively long period of time.

Heretofore mirrors or reflecting means have been used in association with microscopes, as have also been lamps and the like, but while the instant construction eliminates the mirror or reflector and holding means therefor, in accordance with another of the objects involved, it is still another object of the invention to utilize a lamp or source of electric light in such manner and with such structural arrangement that the aforesaid results may be obtained.

Since the present arrangement is simplified, involving as it does relatively light or reduced parts, which are symmetrically arranged to produce a device of neat appearance, it follows that said device may be readily portable, even with the lamp in working position, and although the arrangement is suitable for all manners of service, in which microscopes have heretofore been used, it is yet another object of this invention to provide a microscope and associated assembly which may also be carried as part of a portable utility means including a case, of this type, such as used on experimental, scientific, educational, or test occasions.

Owing to the lamp being substantially ordinarily uncovered, as when packing the stand, and being assembled with the simplified parts, it is another feature of the arrangement that when said case is opened the assembly may attract attention, which may lead to use of the electric cord or extension, the latter being likewise a part of the combination, with the further result that the assembly may at once be used, as for one of the aforesaid purposes.

With the above indicated objects and advantages in view, as well as others which will hereinafter appear, the essential features of the present improved constructions are herein fully described, and illustrated in the accompanying drawing, in which:

Fig. 1 is a view in perspective of a microscope and illuminated stand therefor.

Fig. 2 is a fragmental vertical section through a base portion of the stand.

Fig. 3 is a vertical section on the line 3—3 of Fig. 2; and

Fig. 4 is a vertical central section through a removable light control attachment.

Referring particularly to the drawing, the instant microscope stand, apart from removable attachments, is cast in suitable metal, of one piece formation, including a manipulating portion 10, opposite which is a barrel member 11, and in said member, in the particular embodiment selected for illustration, a microscope 12 is frictionally adjustably fitted.

The stage or platform portion of the stand includes integral arms 13, each alike, below which is a laterally extending apertured part 14, having therein a bore 15, with an expansion 16, hereinafter again referred to. Below the expanded part 14, the base includes, on opposite sides thereof, back heel portions 17, each alike and one of which is seen in Fig. 1.

Extending forwardly from the base part 14 and heel 17 are hollow spaced feet 18, 19, which are therefore relatively light and of considerable height. Each foot or member 18 or 19, consists of an inner wall 20, a top wall, as shown, and an outer wall 21, in which, on each side of the base, is a groove 22. The front ends of the members 18, 19 are formed with closure walls 23, 24, and the hollow 25, within each foot extends from the front to the back end thereof.

In the expanded front opening 16 of the base 14 is a socket 30 of an electric lamp, the latter having a bulb or light source, and an energy supply cord, all as conventionally represented in the drawing, said cord having a connecting plug with terminals, of usual construction, and the filament of the bulb being disposed on the axial line of the microscope 12.

Around said member 30 is a socket bushing 33, preferably of insulating material. The bulb of the lamp is threadedly mounted in the socket 30, in the ordinary way, and said socket with the bushing 33, are permanently fixed in place in the opening 16, although they may be removed on certain occasions, as for exchange of parts.

On the stage 13 of the stand, in the present instance, is a suitable retaining spring 34, for a removable glass plate 35, said spring having a back tang, as shown, said tang being disposed, frictionally permanently in an aperture 36 of the metal stand.

Light control or diffusing means include a sheet metal clip having relatively broad legs 37, of similar construction, and joined at the top around an opening 38, said legs being provided with channeled connections 39, 40, in which a glass plate 41, of appropriate transparency, is removably gripped. Substantial duplicates of the plate 41, as in the aforesaid portable means, may be provided, and such plates may include, as used in practice, with the instant device, members of different colors.

The rabbets or grooves 22 extend completely along straight portions of the outer walls of the feet 18, 19, and in the grooves are releasably positioned flanges 43, 44 of the legs of the clip 37, said legs having a tendency to contract or spring inwardly.

The present invention is disclosed herein in such manner that the same may be readily understood. Only a single form of each element of the organization is illustrated, and these elements are selected from others, as modified forms of the invention. Therefore, it is the desire to have the appended claims interpreted in such manner as to read on obvious changes of structure, in view of the illustration made in the accompanying drawing, that may rightly fall within the scope of said claims.

I claim:

1. In an assembly of the class described comprising a metal stand including an upper portion having means for carrying a microscope tube, a back base portion below the upper portion and having therein an opening, a lamp socket disposed in the opening and having a forwardly projecting light bulb, the filament of the bulb being optically axial with the microscope tube, feet extending from the back portion on opposite sides of the bulb, said feet having grooves therein, a sheet metal clip having flanges grippingly disposed in the grooves, said clip having an open top, and a light diffusing glass carried by said top over its opening.

2. In combination, in an assembly comprising a metal stand having an upper manipulable portion and a portion for embracing a microscope tube, with a platform therebelow; a base portion integral with the first portion and having a laterally extended part with base heel means thereon, said part having a front to rear opening therethrough; an incandescent lamp having a socket fixed in the opening, said socket having a flexible energy supply line extending backwardly therefrom, a light bulb projecting forwardly from the socket, spaced feet extending forwardly from said heel means and having rabbets therein, said bulb being between the feet; light control means including a sheet metal clip having lower leg portions in the rabbets, an upper portion having an orifice above the bulb, and a light diffusing glass disposed on said upper portion with an area greater than that of said orifice.

3. In an optical instrument, the combination of a stand comprising a medial integral portion including two spaced arms, the stand having a top tubular portion, a microscope having its tube adjustably disposed in the top portion, the optical axial line of the tube being between the arms, said stand having therein an aperture at the jointure of the arms, spaced feet forming a base for the stand, said base having means therein for holding a light bulb, the latter being between the feet with its filament on said line; a light diffusing glass; means cooperating with said feet for supporting the glass above the bulb, a glass work holding plate supported by said arms, a spring element having fingers holding the plate, and a portion extending from said element and fixedly held in said aperture.

4. A device of the character described comprising the combination of a microscope member, a one-piece metal casting forming a stand and including a medial portion having two spaced arms forming a platform, with an aperture in the casting just above the plane of the top surface of said arms, the stand having a top portion forming a barrel for frictionally holding therein the tube of the microscope member; said casting having a base including two coacting feet with forwardly disposed parallel spaced parts having grooves in their outer sides, said feet being joined at their heel parts, a lateral expansion forming a portion of the stand at the jointure of the feet and having thereat an opening for receiving the socket of a light bulb, the latter being between said feet with the filament of the bulb on the optical axial line of the microscope tube; a glass work holding plate supported by said arms, a spring element having fingers for holding the plate on said surface, said element having a back extension fixedly held in the aperture of the casting; a light diffusing glass, and means cooperating with said feet for supporting said glass above the bulb, said means including a sheet metal clip having horizontal channeled connections providing an opening, said glass being frictionally held in said connections, and outwardly and downwardly disposed relatively broad legs extending from the connections and having lowermost flanges disposed in the side grooves of said feet.

JACQUES LOUIS GARY.